(12) United States Patent
Ahmed et al.

(10) Patent No.: US 12,078,498 B2
(45) Date of Patent: Sep. 3, 2024

(54) PERSONALIZED MOBILITY AS A SERVICE

(71) Applicant: Intel Corporation, Santa Clara, CA (US)

(72) Inventors: Nesreen K. Ahmed, Santa Clara, CA (US); Ignacio J. Alvarez, Portland, OR (US); Ravikumar Balakrishnan, Beaverton, OR (US); Hesham Mostafa, San Diego, CA (US); Giuseppe Raffa, Portland, OR (US); Nageen Himayat, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 740 days.

(21) Appl. No.: 17/131,427

(22) Filed: Dec. 22, 2020

(65) Prior Publication Data
US 2021/0108939 A1 Apr. 15, 2021

(51) Int. Cl.
*G06N 20/00* (2019.01)
*G01C 21/34* (2006.01)
*G06N 3/08* (2023.01)

(52) U.S. Cl.
CPC ........... *G01C 21/3484* (2013.01); *G06N 3/08* (2013.01); *G06N 20/00* (2019.01)

(58) Field of Classification Search
CPC ....... G01C 21/3484; G06N 20/00; G06N 3/08
See application file for complete search history.

(56) References Cited

U.S. PATENT DOCUMENTS

| | | | | |
|---|---|---|---|---|
| 2013/0218379 | A1* | 8/2013 | Filev | G01F 9/023 701/123 |
| 2014/0200737 | A1* | 7/2014 | Lortz | B60R 25/25 701/1 |
| 2018/0211337 | A1* | 7/2018 | Ghaddar | G06Q 50/14 |
| 2020/0104289 | A1* | 4/2020 | Premawardena | G06F 16/182 |

OTHER PUBLICATIONS

Amaoutaki, Konstantina, "A Hybrid Knowledge-based Recommender for Mobility-as-a-Service", in Proceedings of the 16th International Joint Conference on e-Business and Telecommunications (ICETE 2019, (2019), 9 pgs.

(Continued)

*Primary Examiner* — Vivek D Koppikar
*Assistant Examiner* — Jeffrey R Chalhoub
(74) *Attorney, Agent, or Firm* — Schwegman Lundberg & Woessner, P.A.

(57) ABSTRACT

Methods, systems, and computer programs are presented for implementing Personalized Mobility as a Service (PMaaS) to improve transportation services delivery. One storage medium includes instructions for detecting, by a mobility as a service (MaaS) system, a request for a trip from a user device of a user. The storage medium further includes instructions for mapping, using a model executing on the machine, the user to a persona from a plurality of persona models. Each persona model has one or more characteristics associated with users of the MaaS system. Further yet, the storage medium includes instructions for determining trip parameters for the trip based on the persona mapped to the user, the trip parameters defining one or more trip segments for the trip, and instructions for providing trip parameters to the user device.

22 Claims, 14 Drawing Sheets

(56) References Cited

OTHER PUBLICATIONS

Callegati, Franco, "Cloud-of-Things meets Mobility-as-a Service: An insider threat perspective", Science Direct Computers and Security 00, (2017), 19 pgs.
Cui, X, "Vehicle Positioning Using 5G Millimeter-Wave Systems", in IEEE Access, vol. 4, (2016), 6964-6973.
Geng, X, "One of a kind: User profiling by social curation", in Proceedings of the 22nd ACM international conference on Multimedia, (Nov. 2014), 10 pgs.
Karagiannakos, Sergios, "Graph Neural Networks—An overview", AI Summer, (Feb. 1, 2020), 4 pgs.
Lange, Oliver, "Traffic prediction with advanced Graph Neural Networks", DeepMind Blog, (Sep. 3, 2020), 12 pgs.
Panagiotakis, Spyros, "Context sensitive user profiling for customised service provision in mobile environments", 2005 IEEE 16th International Symposium on Personal, Indoor and Mobile Radio Communications, vol. 3, (2005), 6 pgs.
Poiklola, Antti, "Mydata a nordic model for human-centered personal data management and processing", Finnish Ministry of Transport and Communications, (2015), 12 pgs.
Rossi, Ryan, "Role Discovery in Networks", IEEE Transactions on Knowledge and Data Engineering (TKDE) vol. 27, No. 4, (Apr. 2015), pp. 1112-1131.
Zui, Zhang, "A hybrid fuzzy-based personalized recommender system for telecom products services", Information Sciences vol. 235, (Jun. 20, 2013), pp. 117-129.

\* cited by examiner

PERSONALIZED MOBILITY AS A SERVICE

TECHNICAL FIELD

The subject matter disclosed herein generally relates to methods, systems, and machine-readable storage media for improving transportation services in a multi-provider environment.

BACKGROUND

Mobility as a Service (MaaS) operators may have contracts with different transportation service providers (TSPs), including public and private entities, to provide transport services within a certain region. The servicing area may be large, even across country borders, which makes it difficult for a single MaaS operator to satisfy all the mobility requirements of all subscribers.

BRIEF DESCRIPTION OF THE DRAWINGS

Various of the appended drawings merely illustrate example embodiments of the present disclosure and cannot be considered as limiting its scope.

DETAILED DESCRIPTION

Figure 1:
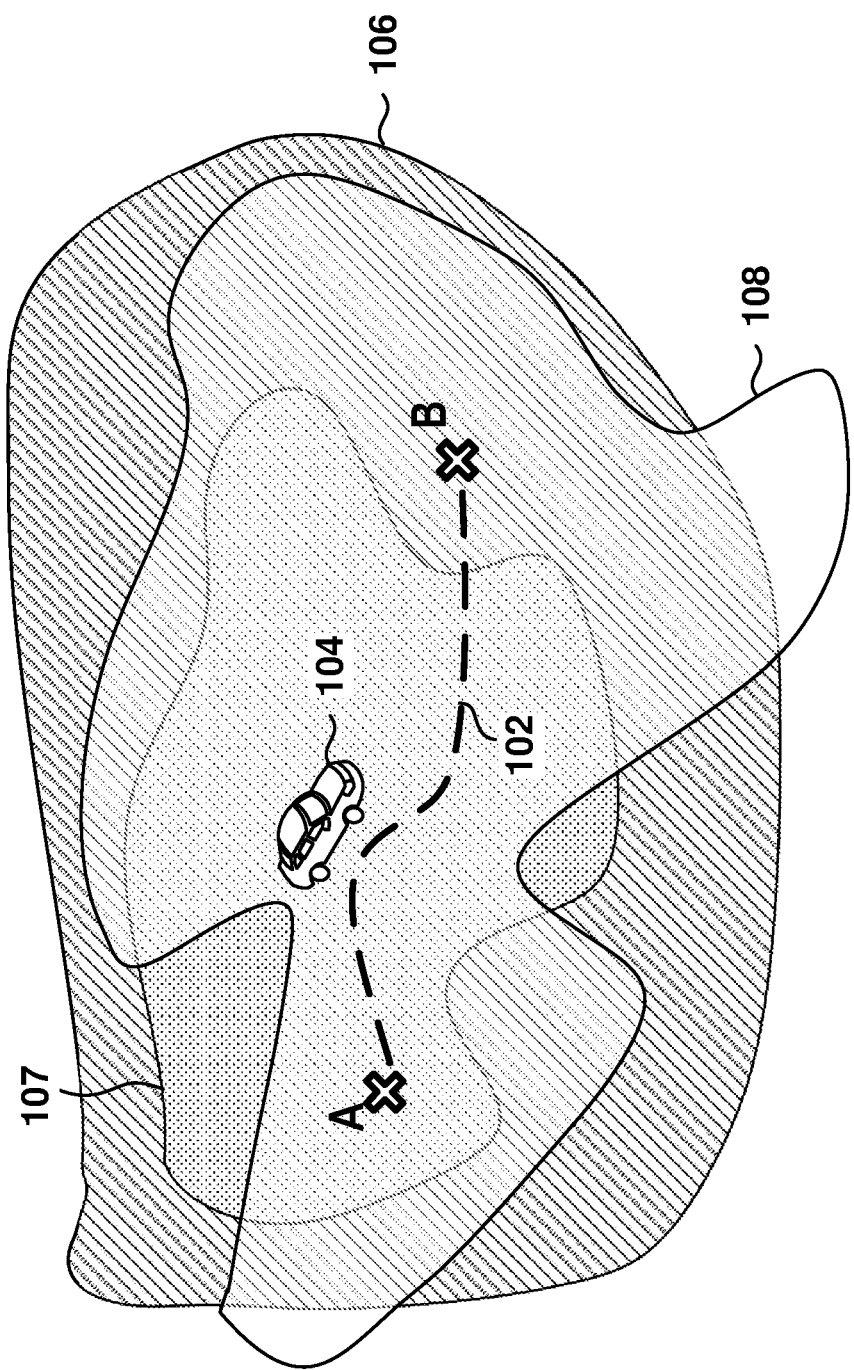
FIG. 1 illustrates a Mobility as a Service (MaaS) scenario with multiple Transportation Service Providers (TSP).

Example methods, systems, and computer programs are directed to implementing Personalized Mobility as a Service (PMaaS) to improve transportation services delivery. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A user may set preferences for choices in transportation with one TSP, but if one trip involves multiple TSPs, the preferences of the user may not be known to the other providers. Also, when new users come on board, there is no information about the user, so selecting the best choice for the user is often a random selection, or the selection that most users may choose.

When dealing with multiple service providers, predicting demand is challenging because one service provider does not have information on the status of other service providers.

What is needed are methods for improving the cooperation between MaaS operators to provide better services to users, including selecting the best choices for users and understanding demand needs to facilitate planning of delivery.

In one aspect, systems and methods for Personalized Mobility as a Service (PMaaS) using structured representations is provided. The system learns a personalized model based on the behavioral features of the users (such as previous trip sequences) and based on contextual features that provide information on the users, e.g., location, gender, age, interests, job, etc. The system provides multiple benefits, such as personalized trip planning, performance analytics, user profiling, improved trip recommendations, while requiring less user data than via the modeling used with generic personas.

A persona is an aspect of someone's character that is presented to or perceived by others. However, these roles are created by humans (e.g., designers) in order to craft solutions for different target populations or users. The notion of persona incorporates an explicit and implicit set of characteristics for the target user based on which recommendations on design can be made.

Further, a graph neural network (GNN) machine learning (ML) architecture is presented to process travel-related historical information on a graph to predict the usage demand for rideshare applications. Road networks naturally lend to be interpreted as graph networks, with nodes indicating locations and edges representing the connecting roads. The locations can indicate the hotspots that can be the pickup or drop-off points. A signal on the graph can be defined such that each node is characterized by a feature vector that corresponds to the attributes relating to dynamic information such as traffic density in the location, congestion incidents, user interactions (e.g., incoming and outgoing users from public transport/by foot), etc. Given a graph signal at a given time, the system predicts the signal at a future time and then labels each node based on its predicted signal as a high or low demand location spot.

One general aspect is for a storage medium that includes instructions for detecting, by a mobility as a service (MaaS) system, a request for a trip from a user device of a user. The storage medium further includes instructions for mapping, using a model executing on the machine, the user to a persona from a plurality of persona models. Each persona model has one or more characteristics associated with users of the MaaS system. Further yet, the storage medium includes instructions for determining trip parameters for the trip based on the persona mapped to the user, the trip parameters defining one or more trip segments for the trip, and instructions for providing trip parameters to the user device.

FIG. 1 illustrates a Mobility as a Service (MaaS) scenario with multiple Transportation Service Providers (TSP). MaaS is the integration of various forms of transport services into a single mobility service accessible on demand. To meet a customer's request, a MaaS operator facilitates a diverse menu of transport options, which may be any combination of public transport, ride-sharing, car-sharing, bike-sharing, taxi, car rental, etc. Each operator may offer services in different areas, such as areas 106-108. For example, a vehicle 104 going from point A to point B may use a route that includes services from area 107 and area 108 along a route 102.

For the user, MaaS offers added value through use of a single application to provide access to mobility, with a single payment channel instead of multiple ticketing and payment operations. MaaS helps users with their mobility needs and solves the inconvenient parts of individual journeys as well as the entire system of mobility services.

A successful MaaS service brings new business models and ways to organize and operate the various transport options, with advantages for transport operators including access to improved user and demand information and new opportunities to serve unmet demand. The aim of MaaS is to provide an alternative to the use of the private cars that is convenient, sustainable, reduces congestion, and is sometimes cheaper.

Providing users with a seamless mobility experience with reduced operational cost involves collection, aggregation, and sharing of data from various entities. For example, historical data about user preferences and trips can be collected from the MaaS User Application during trip initiation, selection, journey, and trip completion. Similarly, TSPs have data about user demands, congestion on the road, environment, charging conditions, etc., through the sensors of their vehicles. MaaS operators also may have agreements with network service providers, which have useful data regarding people mobility patterns for various geographic areas and times of day. Sharing such data fragments among the MaaS operators will be mutually beneficial, e.g., providing users with better experiences (e.g., zero wait time, no coverage hole), and maintaining a healthy fleet.

One example where data sharing may benefit multiple entities is the case where the TSPs collects information about user preferences, and then this information is used, e.g., by a machine-learning (ML) model, to predict what the user will prefer for the service in future trips. The ML models require a large amount of data for accurate predictions. However, one TSP may not be able to collect enough information for a good model predictor. If multiple TSPs are able to share their data about user preferences, then the accuracy of the models will improve because there is more data available about user preferences.

Another example of the benefits of sharing information is that one TSP may be transporting several users to a certain area that is serviced by another TSP. By having visibility on the traffic in the first TSP, the second TSP is able to better predict user demand and configure the vehicles for satisfying the demand that might arise in a certain area. The vehicles may include public transportation vehicles (e.g., buses, trains) as well as private transportation vehicles.

Figure 2:
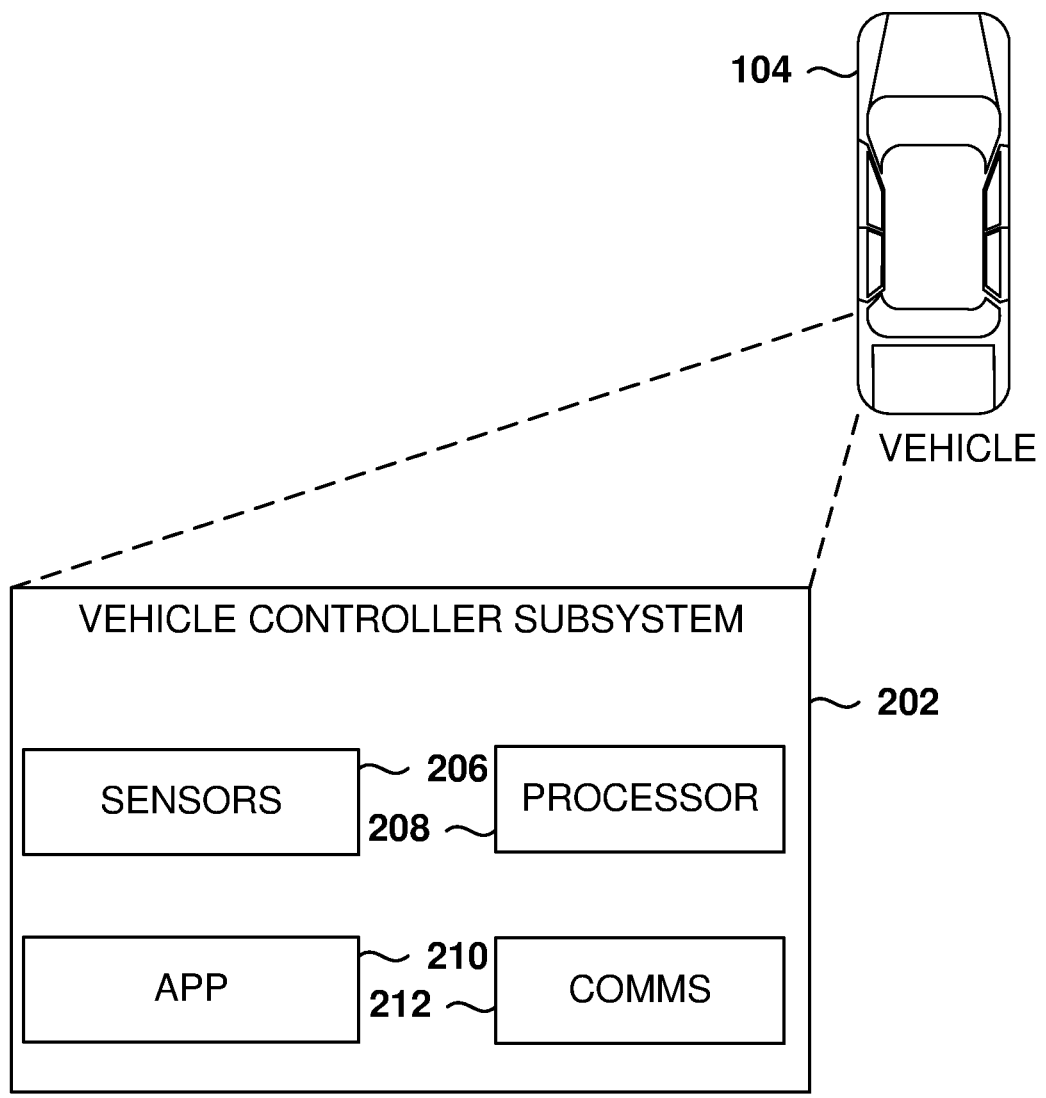
FIG. 2 is a schematic drawing illustrating a system to control a vehicle, according to some example embodiments.

FIG. 2 is a schematic drawing illustrating a system to control a vehicle 104, according to an embodiment. FIG. 2 includes a vehicle controller subsystem 202 incorporated into the vehicle 104.

The vehicle 104 may be any type of vehicle, such as a commercial vehicle, a consumer vehicle, a recreation vehicle, a car, a truck, a motorcycle, or a boat, able to operate at least partially in an autonomous mode. The vehicle 104 may operate at times in a manual mode where the driver operates the vehicle 104 conventionally using pedals, steering wheel, and other controls. At other times, the vehicle 104 may operate in a fully autonomous mode, where the vehicle 104 operates without user intervention. In addition, the vehicle 104 may operate in a semi-autonomous mode, where the vehicle 104 controls many of the aspects of driving, but the driver may intervene or influence the operation using conventional (e.g., steering wheel) and non-conventional inputs (e.g., voice control).

In some example embodiments, a vehicle controller subsystem 202 includes sensors 206, a processor 208, a user application 210, and a communications module 212. The communications module 212 may utilize a network, which may include local-area networks (LAN), wide-area networks (WAN), wireless networks (e.g., 802.11 or cellular network), the Public Switched Telephone Network (PSTN) network, ad hoc networks, personal area networks (e.g., Bluetooth), vehicle-based networks (e.g., Controller Area Network (CAN) BUS), or other combinations or permutations of network protocols and network types. The network may include a single local area network (LAN) or wide-area network (WAN), or combinations of LANs or WANs, such as the Internet. The various devices coupled to the network may be coupled to the network via one or more wired or wireless connections.

The sensors 206 may include various forward, side, and rearward facing cameras, radar, Light Detection and Ranging (LIDAR), ultrasonic, or similar sensors. The vehicle 104 includes an on-board diagnostics system to record vehicle operation and other aspects of the vehicle's performance, maintenance, or status. The vehicle 104 may also include various other sensors, such as driver identification sensors (e.g., a seat sensor, an eye tracking and identification sensor, a fingerprint scanner, a voice recognition module, or the like), occupant sensors, or various environmental sensors to detect wind velocity, outdoor temperature, barometer pressure, rain/moisture, or the like.

Based on the sensor data, the processor 208 in the vehicle controller subsystem 202 is able to determine whether a possible collision may occur. Based on this determination, the vehicle controller subsystem 202 may initiate corrective action and communicate with nearby vehicles.

The user application 210 interacts with a user or a server to present information and receive inputs. For example, the user application 210 may receive commands from the operations center to establish a route for a user, or the user application 210 may send information collected about the trip, such as timing, location, fuel consumption, battery status, distance, etc.

Figure 3:
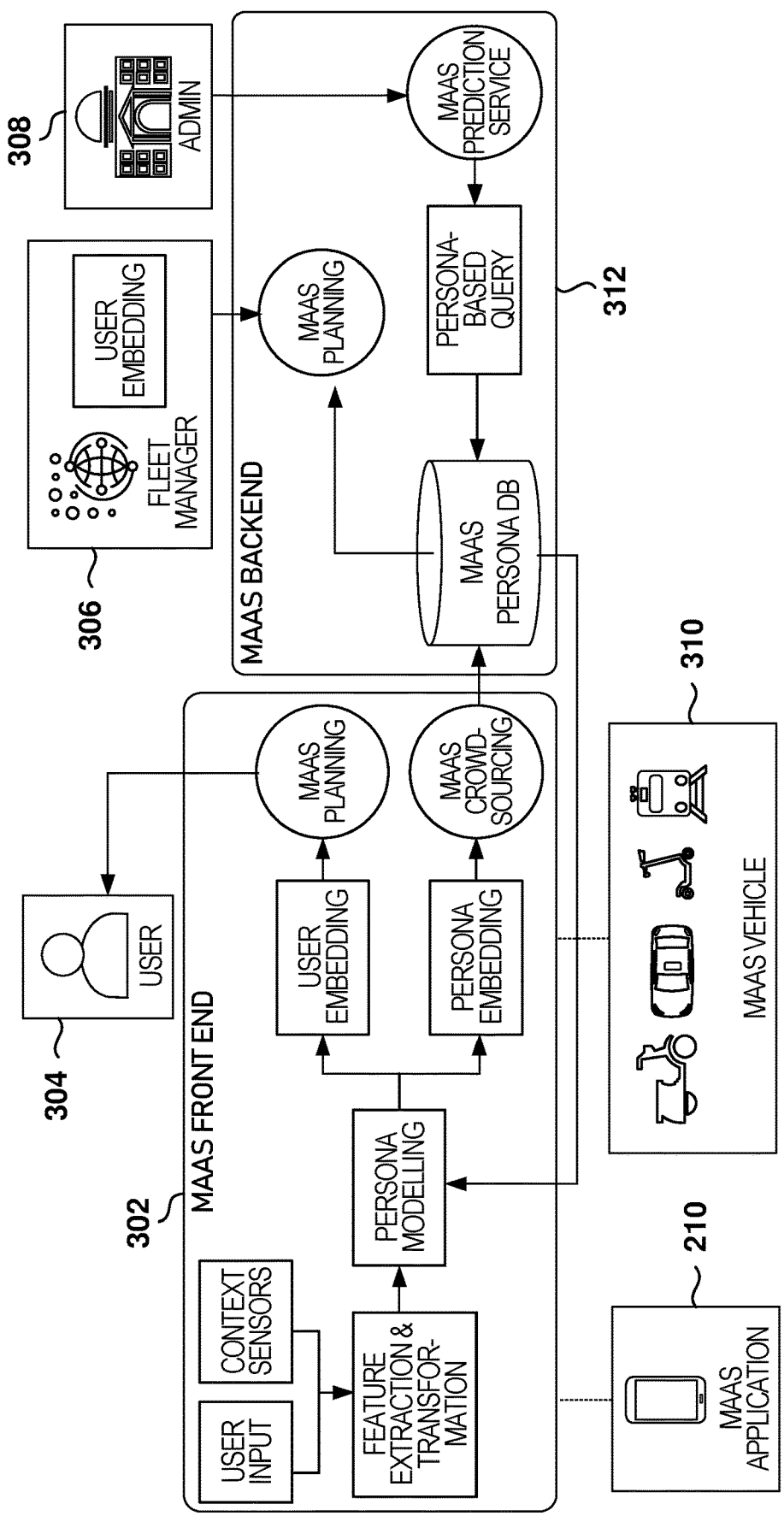
FIG. 3 is a sample architecture of a system for implementing Personalized Mobility as a Service (PMaaS).

FIG. 3 is a sample architecture of a system for implementing Personalized Mobility as a Service (PMaaS). The proposed system and method for Personalized Mobility as a Service uses persona modeling and can be used for several applications, including personalized trip planning, analytics, user profiling, recommendations, and better user personalization, while requiring less user data.

A persona is a fictional person that has defined values for one or more characteristics associated with users. The persona is an aspect of someone's character that is presented to, or perceived by, others. Each persona can be used to represent a plurality of users that share, at least some of, the values for the characteristics of the users. For example, when a new user joins the system, the limited information about the user may be utilized to associate the user with a given persona and then make predictions for the new user (e.g., travel preferences) based on the given persona.

The PMaaS system utilizes structured representation and builds universal privacy-preserving models for personas, which are useful for efficient and scalable generation of recommendations, which improve user satisfaction because the PMaaS is better at predicting service delivery based on user preferences.

The PMaaS system includes a MaaS front end 302 and a MaaS back end 312. The MaaS front end 302 is a user application 210 residing on a device of the user 304, and also includes information collected from MaaS vehicle 310 (e.g., information from sensors). In some example embodiments, the user application 210 is an application provided by a TSP, such as Uber, or an application that interacts with multiple TSPs to determine trips for the user, but other types of MaaS applications may also be used.

The vehicle information may be collected by the MaaS application in the device of the user, or may be sent to the MaaS backend 312 via other modes of communication available in the MaaS vehicle 310. The MaaS backend 312 includes programs for MaaS planning and storage for MaaS persona and user information.

The MaaS front end 302 includes a persona modeling program that models the different personas in the system and uses as inputs the inputs from the user and context sensor information. The features associated with the inputs are extracted and transformed for the persona modelling (e.g., embedding values into vectors).

The persona modeling generates user embeddings (representing information about the users) and persona embeddings (representing information about personas). The user embeddings are used for MaaS planning for the user 304 (e.g., to make predictions on routes, identify user preferences for the types of vehicles to be used), and the persona embeddings are used for MaaS planning for all the personas (e.g., referred to as MaaS crowd-sourcing). The persona embeddings are sent to the MaaS backend 312 in a store in the MaaS persona database.

Persona modeling includes gathering the contextual information from the devices and using the information to learn about preferences of the users, and these preferences may be associated with the corresponding personas.

Once the user books a particular ride, the PMaaS detects that the user is in the vehicle 310 (e.g., scooter, car, motorcycle, train) and, sometimes, accesses the information from the sensors in the vehicle 310.

As the information is collected by the MaaS backend 312, an administrator 308 processes the user data that is used by the MaaS prediction service to perform MaaS predictions based on persona information.

A fleet manager 306 is able to do MaaS planning for the vehicles based on the persona information for the community. For example, the fleet manager 306 is able to predict locations where demand will be higher at a certain time (e.g., within the next 30 minutes) and deploy some available resources to the area with increased demand. In another example, the fleet manager 306 predicts how many people will be using the train service within the next hour. These predictions are based on persona profiles, and the persona profiles may be associated with a particular location or a particular type of user.

The PMaaS system models the behavioral patterns of people, and the contextual information extracted from users as personas, also referred to herein as user roles. The contextual information is used for creating personalized models in order to derive models that can be aggregated and applied to many users. This is particularly valuable in the case of information sparsity problem, where there is little information known about a particular user. By using a persona, the user can be associated with the persona and then predictions can be performed based on the persona. For example, a persona can be associated with a "biker," a "common traveler," a "train rider," a taxi driver, etc.

Additionally, as the number of users associated with a particular persona grows, more information is available for the persona, and the models are able to perform better because, generally, the more information available, the better the models will perform.

The PMaaS system has several benefits, which include personalized models for trip recommendations, privacy protection by using personas instead of specific users, and improved recommendations for new users of the system.

Figure 4A:
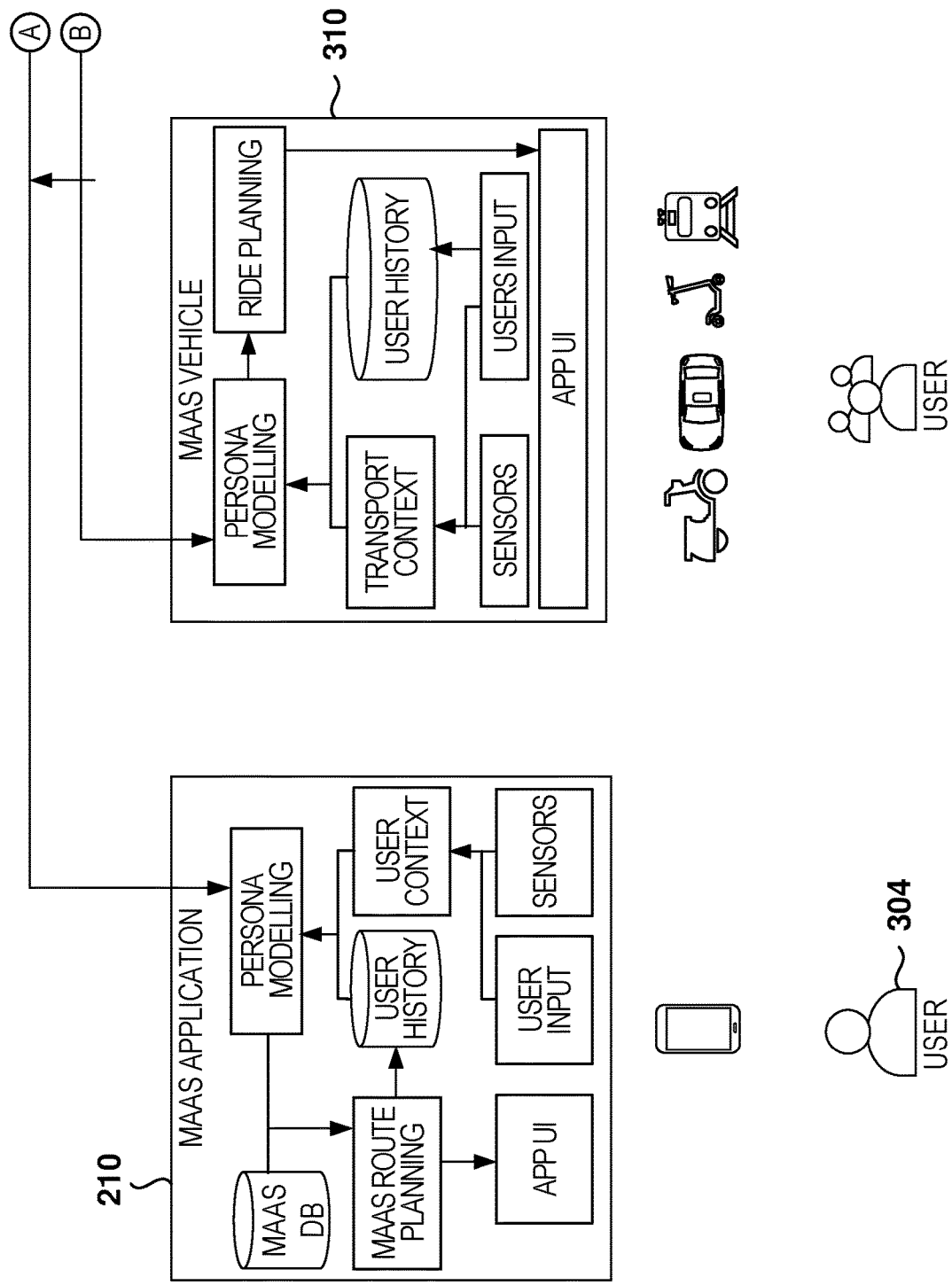
FIGS. 4A-4B illustrate a sample architecture for persona-based modelling of MaaS users, according to some example embodiments.
Figure 4B:
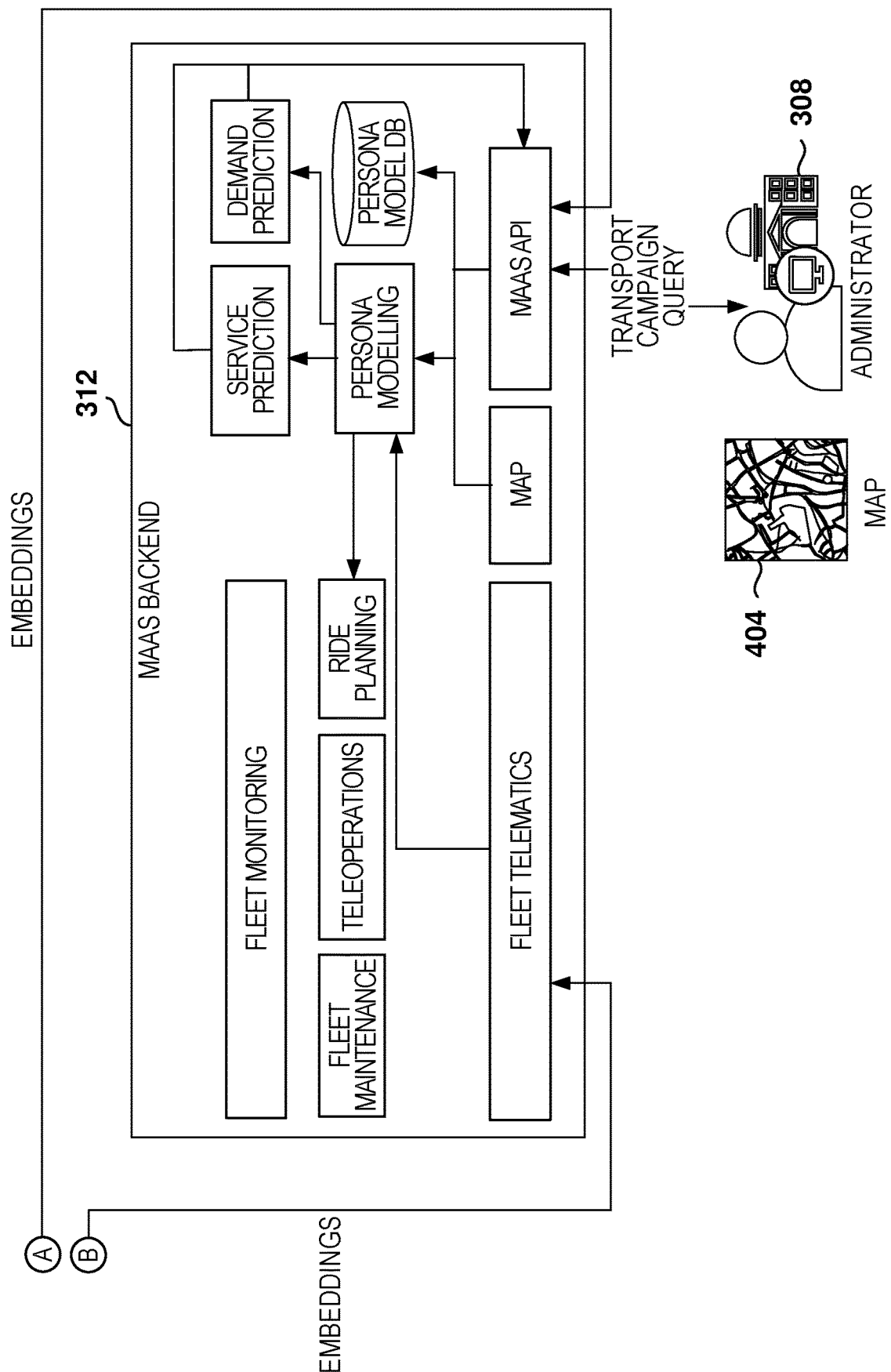

FIGS. 4A-4B illustrate a sample architecture for persona-based modelling of MaaS users, according to some example embodiments. FIGS. 4A-4B provide additional detail on the architecture defined with reference to FIG. 3.

FIG. 4A shows details of the user application 210 and the MaaS vehicle 310. The persona modelling may take place at the user application 210 and the MaaS vehicle 310 for ride planning, using contextual data regarding transportation data, the user data (e.g. profile, user history), sensors, and user input. The persona modeling may use user information as well as persona information.

An application user interface (UI) may be provided on the user application 210 and the MaaS vehicle 310 to perform transportation-related operations, such as requesting trips, setting up payment, setting up profile information, etc.

The information from the user application 210 and the MaaS vehicle 310 is transferred to the MaaS backend 312, as illustrated in FIG. 4B. In some cases, the information is embedded, such as by representing the information in vectors that represent the user information (e.g., user profile information is encoded into a vector).

The MaaS backend 312 includes fleet monitoring, fleet maintenance, teleoperations, ride planning, and a fleet telematics. Fleet monitoring is for tracking the fleet of vehicles, fleet maintenance is for scheduling maintenance for the vehicles, ride planning is to design trips, which uses persona modelling to use the persona attributes to select the best trips for the user based on the associated persona. The fleet telematics receive information from the vehicles in the fleet.

Besides ride planning, persona modeling is used for service prediction (e.g., times of congestion, maintenance) and demand prediction (e.g., for a particular time, in a particular geographic area). A MaaS Application Programming Interface (API) is provided to allow programmatic access to the MaaS backend 312, such as by an administrator application 308, to manage the MaaS. The MaaS utilizes a map 404 for information for modeling the system and scheduling ride delivery.

The MaaS backend 312 predictions may be sent back to the vehicles in the fleet via the fleet telematics.

Figure 5:
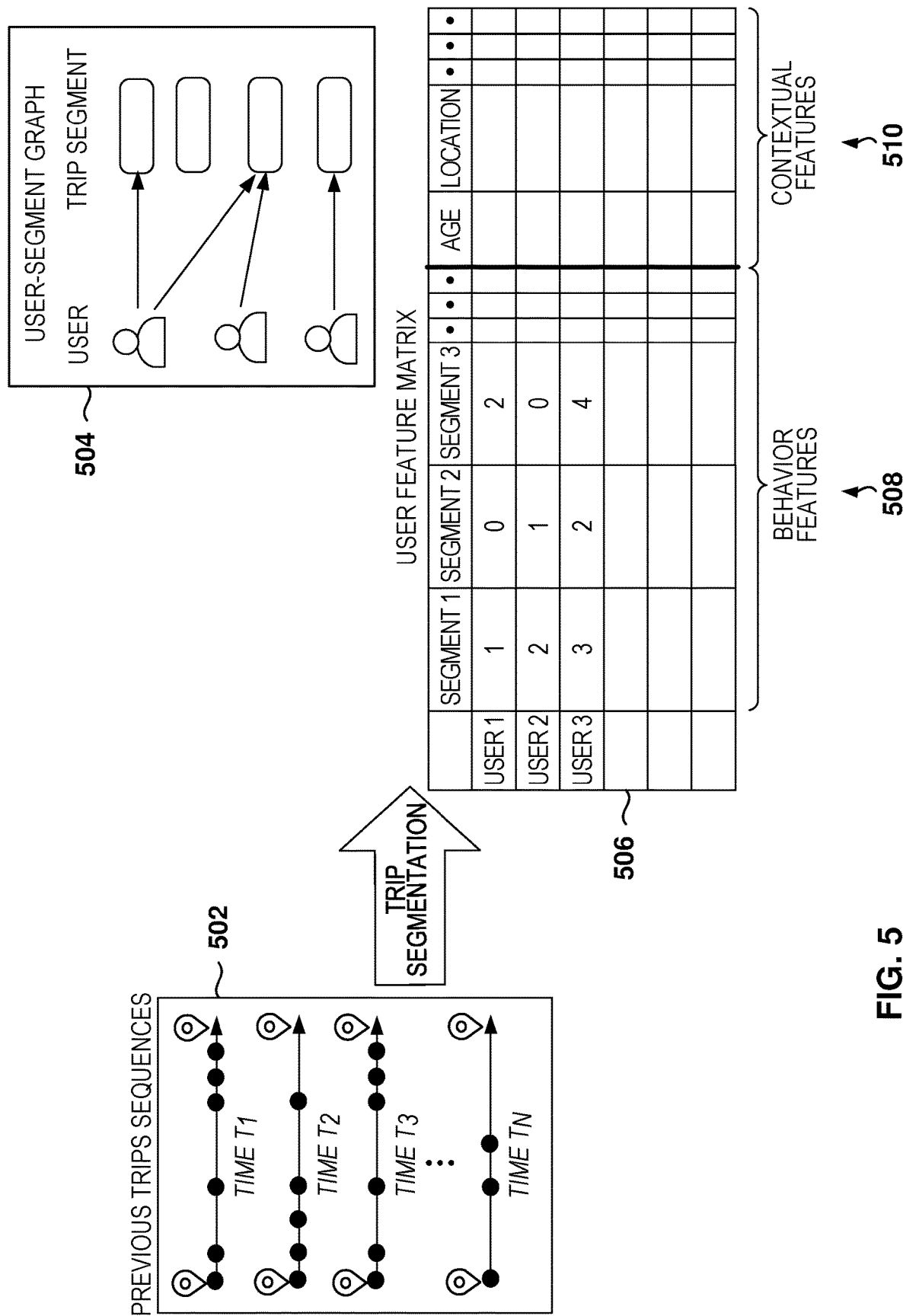
FIG. 5 is an overview of the feature transformation and extraction in PMaaS, according to some example embodiments.

FIG. 5 is an overview of the feature transformation and extraction in PMaaS, according to some example embodiments. As discussed above, the PMaaS system utilizes user profiling and modeling, which involves building and adapting a conceptual understanding of the user, where the goal is to provide a customized and adaptive mobility service to the user.

FIG. 5 illustrates the process for feature extraction and transformation. The user data is categorized into two types: contextual data and behavioral data. The contextual user data (e.g., location, gender, age, interests, job) are the pieces of data that provide context to a user. This contextual data is important for providing a broader understanding of user segments and to be able to offer service differentiation in a crowded pool of similar users. The behavioral data refers to the raw user event data captured during previous sessions in which users use mobility services and applications (e.g., previous trip sequences 502).

The contextual information of the user may include profile information (e.g., age, address, job), and also activities that the user may be engaged in during the trip, such as talking on the phone, playing a game, checking email, etc. This information may be used to create the persona.

The contextual data and behavioral data are associated with corresponding features: contextual features 510 and behavior features 508. The user feature matrix 506 is built by combining the information for the different users in the different types of features. In the illustrated example, the feature matrix 506 includes one row for each user, where the trips for the user are included in vector format, and the contextual features are added following the behavior features values. That is, a vector is formed for each user with embedded information for behavior features 508 and contextual features 510, and the user feature matrix 506 is built by combining all the user vectors.

One example of a trip sequence is a user that, in the same trip, took a taxi, went to the train station, took the train, and then took a bicycle to reach the destination.

In some example embodiments, the feature transformation and extraction component takes as input a list of previous user trip sequences and creates trip segments which are adjacent segments of the trip sequences. The PMaaS system creates a user-segment graph 504 which is then used to derive the user feature matrix. In addition, in the case that a new user that has not taken any trips thus far has no segments, the PMaaS system still leverages the contextual features of the user to make relevant recommendations, e.g., by finding users with similar location, age, etc.

Figure 6:
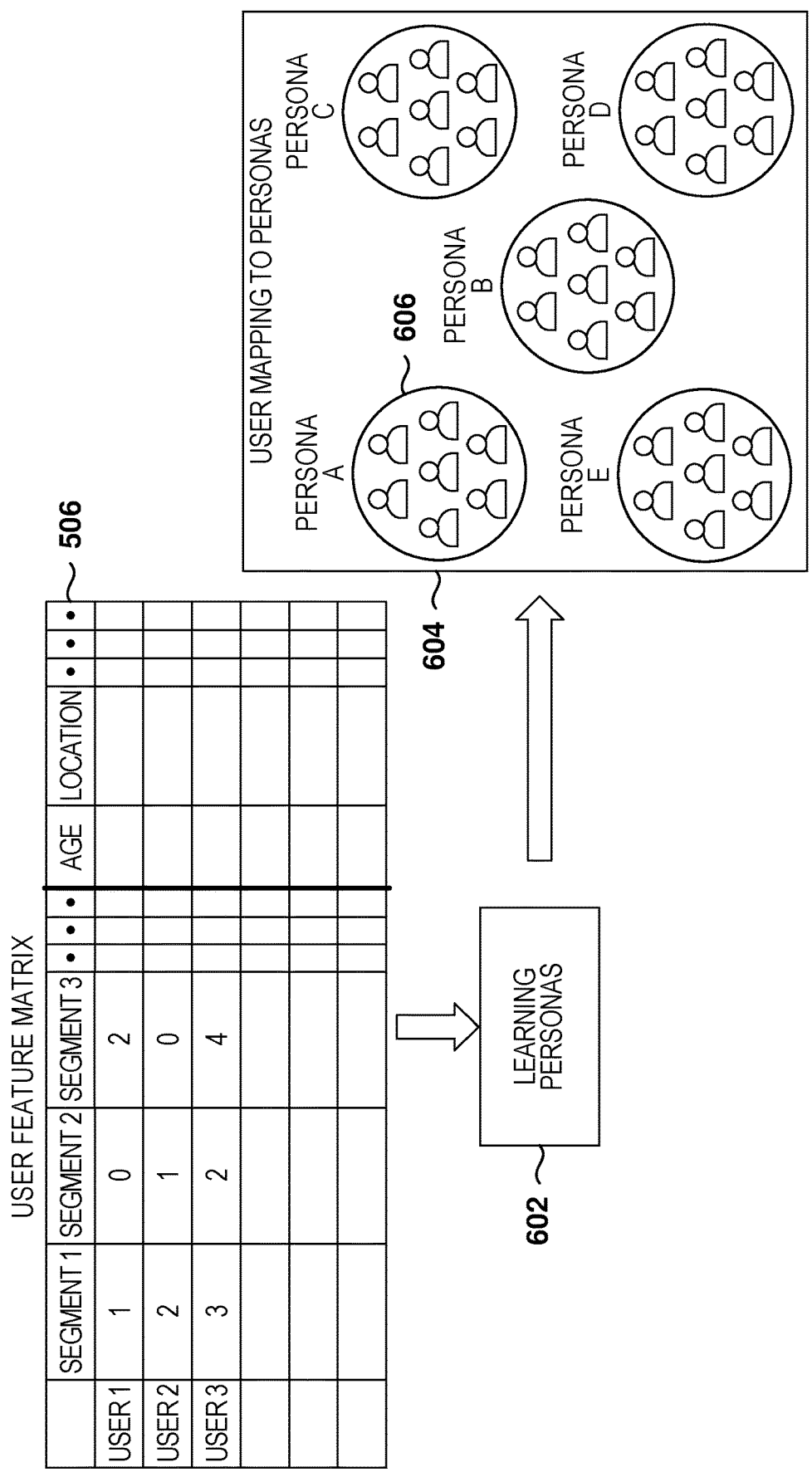
FIG. 6 illustrates the mapping of users to personas, according to some example embodiments.

FIG. 6 illustrates the mapping of users to personas, according to some example embodiments. The learning of the personas 602 utilizes the user feature matrix 506 as input and generates a plurality of mappings 604 of users to personas 606. That is, each user is associated with one of the personas 606. In some example embodiments, each user is associated with one persona, but in other example embodiments, the same user may be assigned to multiple personas (e.g., one persona as a commuter and the second persona as a scooter rider). In some example embodiments, one persona is selected for the user according to the highest probability associated with the user being associated with that persona.

Given the user-feature matrix 506, the PMaaS system learns the personas of the different users. The personas 606 can be learned, in a data-driven approach, directly from the user feature matrix 506, or from the low-dimensional user embeddings.

Let X denote the input user-feature matrix 506, then we can obtain the best rank-k factorization of X as $X\_k=USV^T$, where k is the number of personas/roles, $p\_i=\text{argmax } U\_i$ is the persona of user $U\_i$, and USV are three matrices used for low rank approximation. It is noted that $U\_i$ is the k-dimensional persona mixed-membership vector defining which users are associated with the persona, and it is assumed that it is normalized to be a stochastic vector. U and V are orthogonal matrices, where U represents the user embedding matrix, and V represents the feature embedding matrix. Further, S is a diagonal matrix of the non-negative singular values. In some example embodiments, singular value decomposition (SVD) is used, but other embodiments may use other low-rank matrix factorization (e.g., non-negative matrix factorization).

In other example embodiments, the PMaaS system leverages any other method to derive the user personas, and this component can be interchanged with another (e.g., a neural matrix factorization method, k-means, etc.). In some example embodiments, the number of personas k is selected automatically using minimum description length (MDL) principal. The result of the learning is a persona model that predicts the persona associated with a user based on the information of the user.

For example, a user wants to go to a concert in San Francisco, which is 50 miles away. The MaaS service, using the persona model, will evaluate the multiple options for reaching the concert site, e.g., take a taxi all the way, take a train followed by an Uber ride, etc. There might be multiple segments, which makes it a multimodal problem. The PMaaS system predicts the probability of a trip given the user persona, and that will be the product over all the segments of that trip. How likely is that the user will take a particular segment (e.g., public train)? The PMaaS will select the trip that gives the highest probability of user making that selection and will recommend that trip.

In multi-modal trip planning, the goal is to generate the top-K recommended trip sequences to the user from a given origin to a given destination, where each trip sequence uses a combination of several transportation modes. After the trip segmentation in the previous steps, the system generates a segment-to-segment graph. The system then uses a graph model such as a graph neural network (GNN) with attention mechanisms to learn the probability of transitioning from any trip segment to any other trip segment given the user persona/role.

Assuming the segment-to-segment graph is called G, let $A=\{a_1, a_2, \ldots, a_m\}$ be a trip sequence with $a_i$ being each of the segments, and let $r_u$ be the user role, then the probability that the trip sequence A is suitable for user role $r_u$ is defined as follows:

$$\text{Prob [trip } A \mid G, \text{User Role} = r_u] = \prod_{a_i, a_j \in A} \text{Prob } [a_j \mid a_i, \text{User Role} = r_u]$$

The process is repeated for a plurality of trip sequences (or filtering or sampling from the learned distribution may be used if needed for efficiency). The system then recommends the top-k most likely trip sequences to the user.

One important application of this component is predicting the next-best-action, or a personalized trip sequence based on the user's past behavior as well as their contextual features. Furthermore, the method is also useful for recommendation of personalized mobility paths. For instance, displaying the top-k planned trips given their current contextual features (e.g., location). In addition, the user can often select certain constraints in the UI, such as their interests or events (e.g., concert). The constrains are then used to filter some trip sequences and show only the most relevant mobility paths for that user given the constraint.

The learned user models and embeddings (for users and personas) can be useful for user profile completion. In addition, since the nature of the persona-based graphs is independent of location data, the persona-based modelling and created graphs databases provide location-independent user behavior modelling that can be used for service and demand prediction as well as individual ride planning. This is a valuable capability needed for the scalability of MaaS services, e.g., planning deployment of new MaaS services like robotaxies or electric scooters in new geographic areas. The persona-based planning enables quick instantiation and bootstrapping based on initial data which is useful for initial deployment adaptation and success.

Moreover, the mapping from users to personas leads a user segmentation which could be used in group and targeted recommendation of trip plans, A/B testing of mobility bundles/plans, targeted advertising, etc. These services can be used by public and on-demand TSPs, such as municipalities, traffic control, and others to make decisions using real-time or prediction models.

In addition, persona-based modelling using the proposed approach can serve to plan possible corner case scenarios such as mobility behaviors under certain traffic conditions or disasters (e.g., city evacuation, large sports events, or pandemics). Fleet operators can make use of these features for optimizing or planning their optimal deployments.

Figure 7:
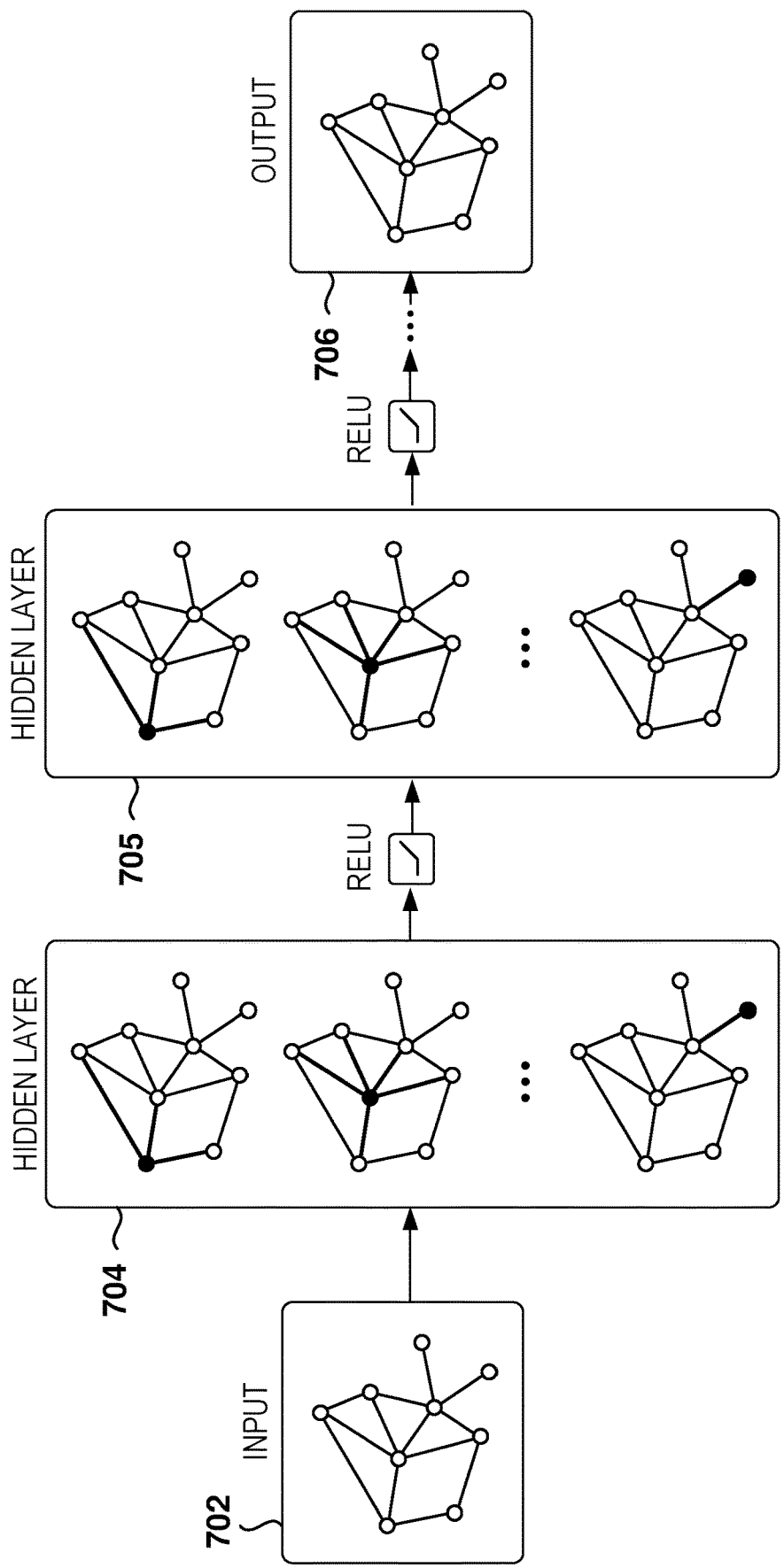
FIG. 7 is a Graph Neural Network (GNN), according to some example embodiments.

FIG. 7 is a Graph Neural Network (GNN), according to some example embodiments. Predicting demand requires an understanding of the traffic behavior as well as user patterns. In some example embodiments, the road networks are viewed as a graph where information propagates in the network in relation to the graph structure (e.g., diffusion of signal through the neighborhood of nodes).

The PMaaS system predicts traffic and customer demand in transportation networks, and the goal is, given any location, given multiple TNCs, to predict what would be the demand for any given location to satisfy ride request, e.g., to provide a ride share.

The benefit for the user is a better quality of experience because the user can get better service faster. For the service provider, benefits include setting price points based on demand and maximizing the number of trips that can be delivered.

In the context of ride demands, the demand at any location is a function of the traffic information in the neighborhood, previous dropoff and pickup information at the location, as well as its neighborhood. Traffic clearly progresses in the road network based on the graph structure of the road, but also other information, such as potential passengers (bus/train ridership), road events (such as congestion/diversion), and previous drop-offs may affect the graph. In some example embodiments, GNNs are used to learn the traffic and user behavior in order to predict future demand at different locations.

In computer science, a graph is a data structure consisting of vertices and edges, and the graph can be described by the set of vertices and edges it contains. The edges can be either directed or undirected, depending on whether there exist directional dependencies between vertices. The vertices are often called nodes.

A Graph Neural Network is a type of neural network which directly operates on the graph structure. A typical application of GNN is node classification.

A neural network is a computing system based on consideration of biological neural networks of animal brains. Such systems progressively improve performance, which is referred to as learning, to perform tasks, typically without task-specific programming. For example, in image recognition, a neural network may be taught to identify images that contain an object by analyzing example images that have been tagged with a name for the object and, having learnt the object and name, may use the analytic results to identify the object in untagged images. A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a predetermined range, based on the known training images, backpropagation is used, where backpropagation is a common method of training artificial neural networks that are used with an optimization method such as a stochastic gradient descent (SGD) method.

Since the GNN is a neural network, the GNN includes an input layer 702, one or more hidden layers 704-705, and an output layer 706. The nodes in the neural network are graphs.

Graph Neural Networks have benefits that make them suitable for PMaaS planning. First, GNNs exhibit locality properties where the GNN operations propagate information through adjacent nodes. Second, the GNNs exhibit equivariance to permutations, which means that processing the signal with GNN is independent of node label or the ordering of the nodes. As a result, models learnt on one set of graphs can be applied to other graphs with nodes permuted differently or perturbed. GNNs also further allow training on different sized road network graphs since the GNN weights are independent of the graph size.

Figure 8:
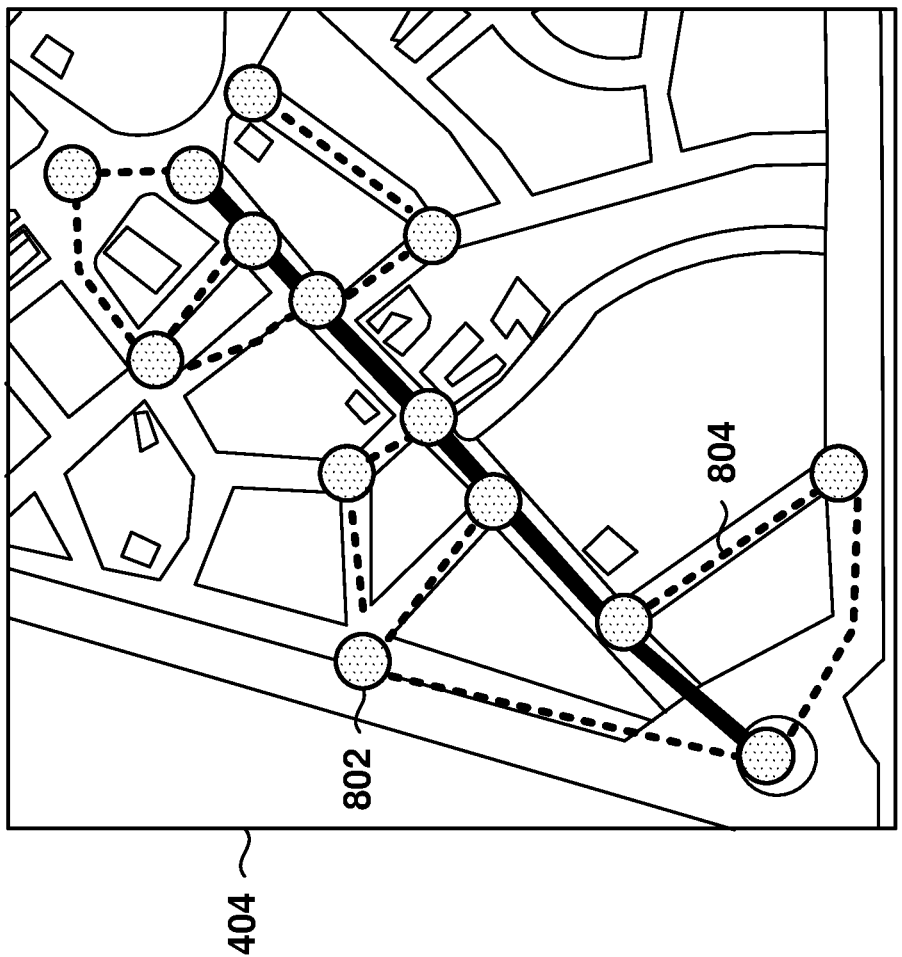
FIG. 8 illustrates the conversion of a map to a GNN, according to some example embodiments.

FIG. 8 illustrates the conversion of a map 404 to a GNN, according to some example embodiments. To set up the demand-prediction model, different road subnetworks are first formed. In this context, each edge 804 represents a physical segment of a road, and the nodes 802 are the intersections of road segments. The graph is then formed based on the nodes and the edges connecting the nodes.

From the general map, candidate road subnetworks (a contained network that is part of the overall map) are selected for training the GNN model. This allows processing information on smaller graphs (or road networks) instead of having to process data for a large graph that would encompass the whole geographic region of interest. By using different subnetworks with diverse set of connectivity structures, it is possible to train the GNN so its used can be generalized on a wide range of road networks.

Further, graph signals are defined to each of the networks. By utilizing the information collected from different locations as well as cars and trips relating to the locations, the graph signal is formed. The demand at any given location can be a function of the traffic information in the neighborhood of that location. Such information is processed where a GNN is trained and then deployed. One way to utilize the resulting model is to overlay the resulting data on the actual map which is provided as a service. Drivers as well as TNCs can subscribe to the service and be able to determine high demand locations.

In some example embodiments, a federated learning approach is used where multiple TNCs leverage a common dataset to optimize their business model, without sharing proprietary information. Federated learning (also known as collaborative learning) is a machine-learning technique that trains an algorithm across multiple decentralized devices holding local data, without exchanging the data. This approach stands in contrast to traditional centralized machine-learning techniques where all the local datasets are uploaded to one server, as well as to more classical decentralized approaches which often assume that local data samples are identically distributed.

Figure 9:
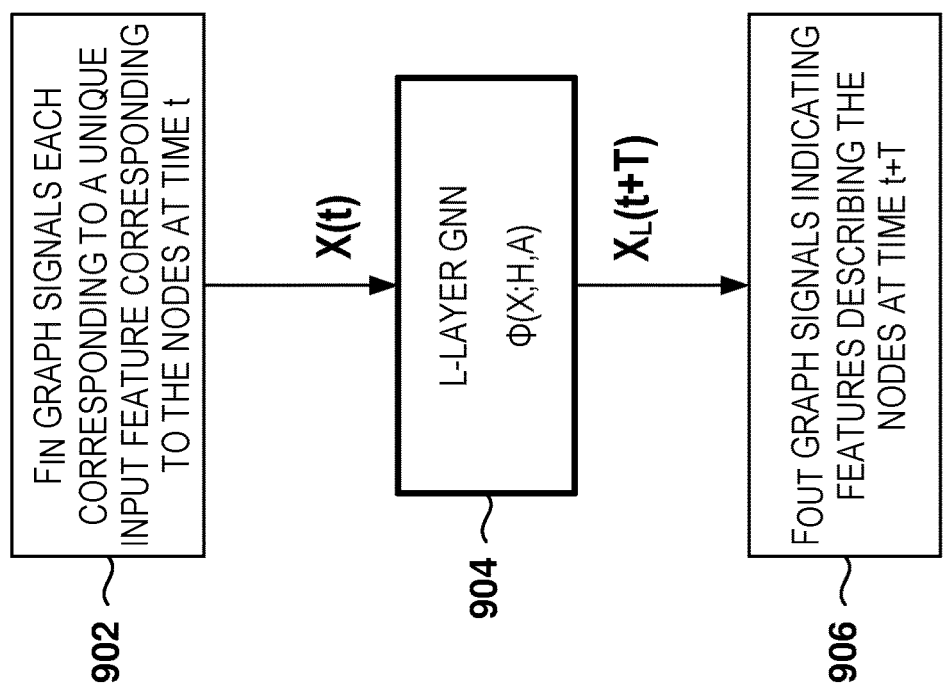
FIG. 9 is a GNN architecture for usage demand prediction in transportation networks, according to some example embodiments.

FIG. 9 is a GNN architecture for usage demand prediction in transportation networks, according to some example embodiments. In some example embodiments, the road network is modeled by defining a signal on a graph G=(V, E, A), where V is the set of nodes that indicate different locations, |V|=N, E represents the set of edges, and A is the adjacency matrix of the graph. An adjacency matrix is a square matrix used to represent a finite graph, where the elements of the matrix indicate whether pairs of vertices are adjacent or not in the graph.

Further, $X \in R^{N \times F_{in}}$ is defined as the signal over the graph where each node is attributed to a signal containing $F_{in}$ features 902. A signal on the graph is defined such that each node is characterized by an $F_{in}$-dimensional feature vector that corresponds to the attributes relating to dynamic information such as traffic density in the location, congestion and traffic incidents, user interactions (incoming and outgoing users from public transport, by foot), etc.

The GNN is trained on the graph signal obtained where the signal at time t is observed as the input X(t). The GNN 904 with L layers outputs the predicted signal $X_L(t+T)$ at future time t+T, which is also a graph signal $X_L \in R^{N \times F_{out}}$.

We can also allow the GNN to output a node label in future (e.g., ranking of the nodes based on the usage demand wherein $X_L \in R^{N \times 1}$. This can be achieved by the use of a readout layer at the end the GNN layers. The following notations describe the proposed Graph Neural Network.

The GNN 904 operator $X_L = \phi(X;H,A)$, where X is the input signal to the GNN and composed of $F_{in}$ graph signals, H is the tensor containing the GNN filter coefficients $H = \{H_{lk}\}_{l,k}$, where l is the layer index and k is the index of the filter coefficient, A is the adjacency matrix of the graph (or a graph shift operator that defines the graph connectivity), and $X_L$ is the output of the GNN that is composed of $F_{in}$ graph signals 906.

The true label $Y \in R^{N \times F_{out}}$ describes the target graph signal at time t+T. The goal of the GNN is to learn a GNN model 904 that determines the output $X_L$ that minimizes an error measure with respect to Y, e.g., the signal $X_L$ is close to the target graph signal Y. It noted that the training signals (X,Y) can be obtained from past observations based on which GNN is trained.

Once the GNN is trained to convergence, the trained model can be applied on the data collected from any time t to predict $X_L$ that can reveal information about the source of congestion. An important property of GNNs is that a model learnt on one or more graphs can be utilized to identify usage demand in other graphs of any arbitrary size. As a result, the proposed solution can be applied to different scenarios once the model is learnt. The generalization performance of GNN depends on the range of input signals as well as the graph structures utilized during training.

Data for training can be collected from TNCs provided by sensor hubs, roadside units (RSUs), gateways as well as vehicle-to-everything (V2X) to compose the signal features. The data includes, but is not limited to, position, speed, acceleration patterns, detected stops, etc. For example, it is expected that 5G mm wave technology will provide finer grain location detection and can be included as a source of information. Sensors from cars as well as node locations can further increase the rate of availability of data for training and inference.

For example, the graph signal at a node includes a vector of information on the location associated with the node. The information may include potential passengers after they are dropped off from a bus, or a train. Also, there could be information related to events, like a game, a movie theater, a shopping mall, a traffic accident nearby, user traffic at the node (e.g., number of users wanting transportation).

Other information may include the time and date (e.g., day of the week, holiday, weekend, month), temperature outdoors. This information is propagated through the graph structure, and the users will travel through the roads that are available or have less congestion.

Further, the information used by the GNN may include persona information to estimate demand based on the information associated with the persona.

In some example embodiments, the output $X_L$ includes the user demand, at time t+T, for all the nodes in the graph. In some example embodiments, the demand is provided as a member indicating a number of users expected to request service, or the demand may be expressed as a score, e.g., from 1 to 10 with 10 as the highest level of demand.

Figure 10:
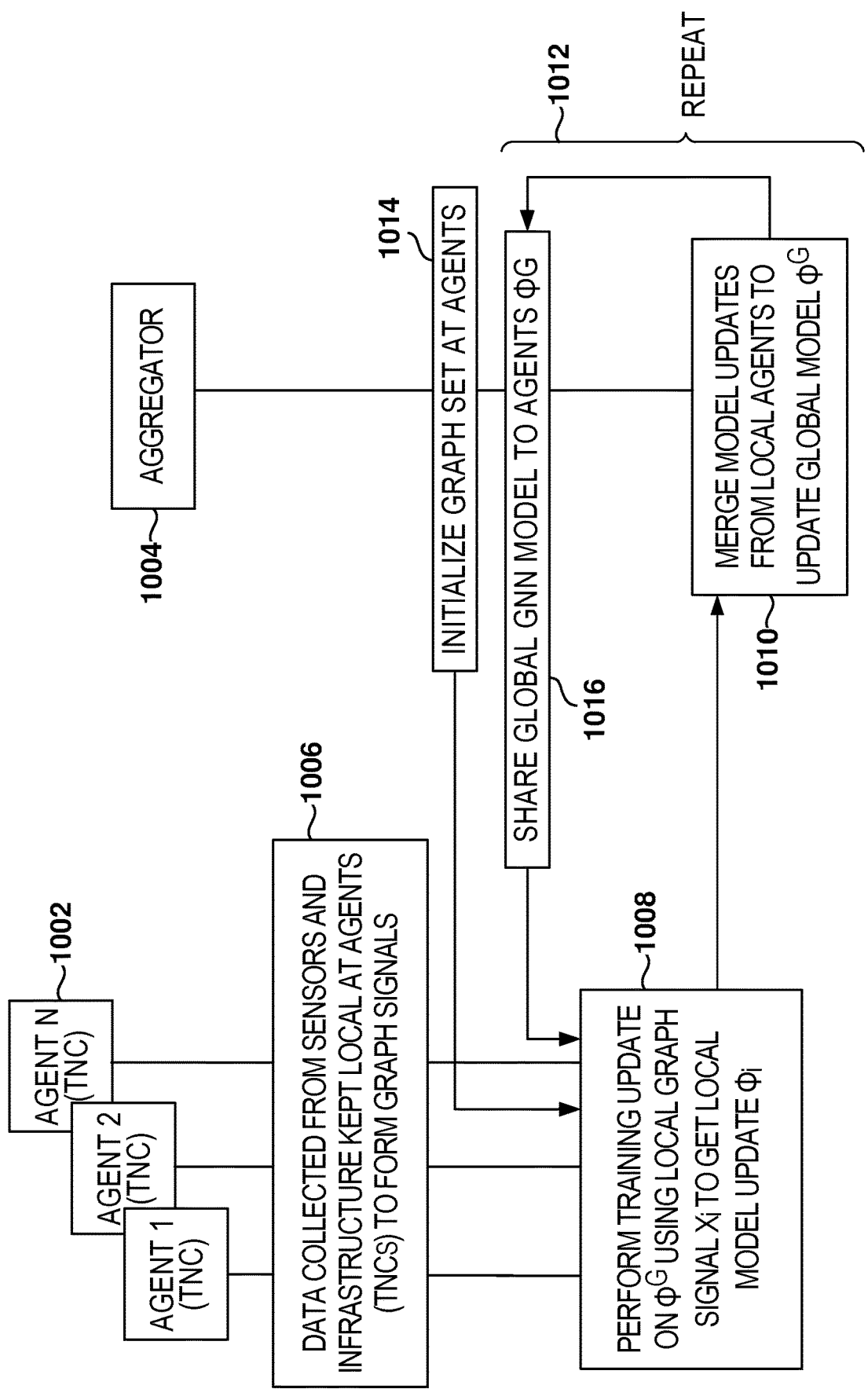
FIG. 10 is flow diagram for federated GNN training across different Transportation Network Companies (TNCs), according to some example embodiments.

FIG. 10 is a flow diagram for federated GNN training across different Transportation Network Companies (TNCs), according to some example embodiments.

Agents at different TNCs 1002 can obtain 1006 different data from sensors and infrastructure and this data is kept at the local TNCs 1002 and used to form signals for the graphs (e.g., users traveling through a node, demand at a node, etc.). This collected information is used to train different GNNs at each TNC to determine usage demands.

Sharing of data can be sensitive between the TNCs due to privacy concerns, but having the additional data can greatly improve the accuracy of the prediction models. To facilitate sharing of data, a federated learning (FL) training of GNNs is utilized, where each TNC collaborates to learn a common model $\phi^G$ which can be iteratively updated from the local models $\phi_i$ from each of the TNCs. The TNCs use the same graph structure to apply the FL approach.

The aggregator 1004 initializes 1014 the common graph set at the agents of the TNCs 1002, that is, providing the structure of the nodes and the edges, as well as the features associated with the graph. Then the aggregator 1004 shares (operation 1016) the global GNN model $\phi^G$ with the agents.

The TNCs 1002 perform training updates 1008 on the model using local graph information $X_i$ and obtain the local model $\phi_i$. The TNCs 1002 share the calculated models with the aggregator 1004. At operation 1010, the aggregator 1004 merges the received $\phi_i$ updates from the TNCs and recalculates the new global model $\phi^G$ using FL.

The process 1012 is then repeated, where the aggregator 1004 redistributes (operation 1016) the updated $\phi^G$ model to the TNCs and then the TNCs can recalculate their local models. The process is repeated until the model converges periodically to account for additional information captured by the TNCs 1002.

Figure 11:
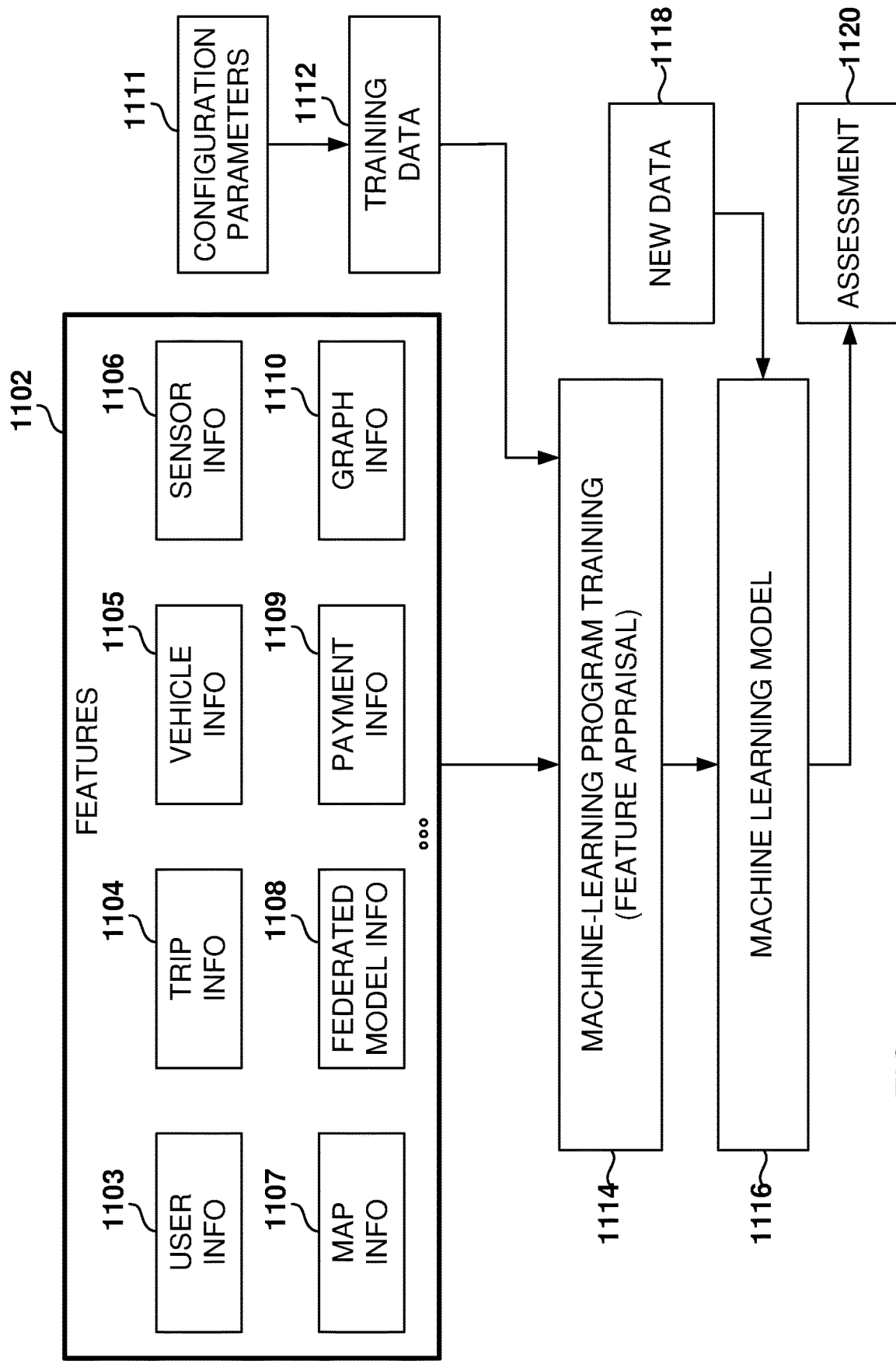
FIG. 11 illustrates the training and use of a machine-learning program, according to some example embodiments.

FIG. 11 illustrates the training and use of a machine-learning program, according to some example embodiments. In some example embodiments, machine-learning programs (MLPs), also referred to as machine-learning algorithms or tools, are utilized to perform operations associated with MaaS operations.

Machine Learning (ML) is an application that provides computer systems the ability to perform tasks, without explicitly being programmed, by making inferences based on patterns found in the analysis of data. Machine learning explores the study and construction of algorithms, also referred to herein as tools, that may learn from existing data and make predictions about new data. Such machine-learning algorithms operate by building an ML model 1116 from example training data 1112 in order to make data-driven predictions or decisions expressed as outputs or assessments 1120. Although example embodiments are presented with respect to a few machine-learning tools, the principles presented herein may be applied to other machine-learning tools.

There are two common modes for ML: supervised ML and unsupervised ML. Supervised ML uses prior knowledge (e.g., examples that correlate inputs to outputs or outcomes) to learn the relationships between the inputs and the outputs. The goal of supervised ML is to learn a function that, given some training data, best approximates the relationship between the training inputs and outputs so that the ML model can implement the same relationships when given inputs to generate the corresponding outputs. Unsupervised ML is the training of an ML algorithm using information that is neither classified nor labeled, and allowing the algorithm to act on that information without guidance. Unsupervised ML is useful in exploratory analysis because it can automatically identify structure in data.

Common tasks for supervised ML are classification problems and regression problems. Classification problems, also referred to as categorization problems, aim at classifying items into one of several category values (for example, is this object an apple or an orange?). Regression algorithms aim at quantifying some items (for example, by providing a score to the value of some input). Some examples of commonly used supervised-ML algorithms are Logistic Regression (LR), Naïve-Bayes, Random Forest (RF), neural networks (NN), deep neural networks (DNN), matrix factorization, and Support Vector Machines (SVM).

Some common tasks for unsupervised ML include clustering, representation learning, and density estimation. Some examples of commonly used unsupervised-ML algorithms are K-means clustering, principal component analysis, and autoencoders.

Another type of ML is federated learning (also known as collaborative learning) that trains an algorithm across multiple decentralized devices holding local data, without exchanging the data. This approach stands in contrast to traditional centralized machine-learning techniques where all the local datasets are uploaded to one server, as well as to more classical decentralized approaches which often assume that local data samples are identically distributed.

Federated learning enables multiple actors to build a common, robust machine learning model without sharing data, thus allowing the creation of powerful ML models while addressing address critical issues such as data privacy, data security, data access rights and access to heterogeneous data.

In some embodiments, example ML model 1116 provides a demand prediction related to MaaS services, such as the demand models described in FIGS. 3, 4A-4B, 6, 7, 9, and 10.

The training data 1112 comprises examples of values for the features 1102. In some example embodiments, the training data 1112 comprises labeled data with examples of values for the features 1102 and labels indicating the outcome, such as trip demand, trips traveled by users, sensor information, etc. The machine-learning algorithms utilize the training data 1112 to find correlations among identified features 1102 that affect the outcome. A feature 1102 is an individual measurable property of a phenomenon being observed. The concept of a feature is related to that of an explanatory variable used in statistical techniques such as linear regression. Choosing informative, discriminating, and independent features is important for effective operation of ML in pattern recognition, classification, and regression. Features may be of different types, such as numeric features, strings, and graphs.

Feature extraction is a process to reduce the amount of resources required to describe a large set of data. When performing analysis of complex data, one of the major problems is one that stems from the number of variables involved. Analysis with a large number of variables generally requires a large amount of memory and computational power, and it may cause a classification algorithm to overfit to training samples and generalize poorly to new samples. Feature extraction includes constructing combinations of variables to get around these large-data-set problems while still describing the data with sufficient accuracy for the desired purpose.

In some example embodiments, feature extraction starts from an initial set of measured data and builds derived values (features) intended to be informative and non-redundant, facilitating the subsequent learning and generalization steps. Further, feature extraction is related to dimensionality reduction, such as reducing large vectors (sometimes with very sparse data) to smaller vectors capturing the same, or a similar, amount of information.

In one example embodiment, the features 1102 may be of different types and may include one or more of user information 1103, trip information 1104, vehicle information 1105, vehicle sensor information 1106, map information 1107, federated-model information 1108, payment information 1109, graph information 1110, etc.

During training 1114, the ML algorithm analyzes the training data 1112 based on identified features 1102 and configuration parameters 1111 defined for the training. The result of the training 1114 is an ML model 1116 that is capable of taking inputs to produce assessments.

Training an ML algorithm involves analyzing large amounts of data (e.g., from several gigabytes to a terabyte or more) in order to find data correlations. The ML algorithms utilize the training data 1112 to find correlations among the identified features 1102 that affect the outcome or assessment 1120. In some example embodiments, the training data 1112 includes labeled data, which is known data for one or more identified features 1102 and one or more outcomes, such as trips delivered, vehicle sensor information, vehicle failures, beginning and ending trip locations, user information, actual demand measured, etc.

The ML algorithms usually explore many possible functions and parameters before finding what the ML algorithms identify to be the best correlations within the data; therefore, training may make use of large amounts of computing resources and time.

Many ML algorithms include configuration parameters 1111, and the more complex the ML algorithm, the more parameters there are that are available to the user. The configuration parameters 1111 define variables for an ML algorithm in the search for the best ML model. The training parameters include model parameters and hyperparameters. Model parameters are learned from the training data, whereas hyperparameters are not learned from the training data, but instead are provided to the ML algorithm.

Some examples of model parameters include maximum model size, maximum number of passes over the training data, data shuffle type, regression coefficients, decision tree split locations, and the like. Hyperparameters may include the number of hidden layers in a neural network, the number of hidden nodes in each layer, the learning rate (perhaps with various adaptation schemes for the learning rate), the regularization parameters, types of nonlinear activation functions, and the like. Finding the correct (or the best) set of hyperparameters can be a very time-consuming task that makes use of a large amount of computer resources.

When the ML model 1116 is used to perform an assessment 1120, new data 1118 is provided as an input to the ML model 1116, and the ML model 1116 generates the assessment 1120 as output. For example, demand prediction at a geographic region, determining user preferences using personas, etc.

Figure 12:
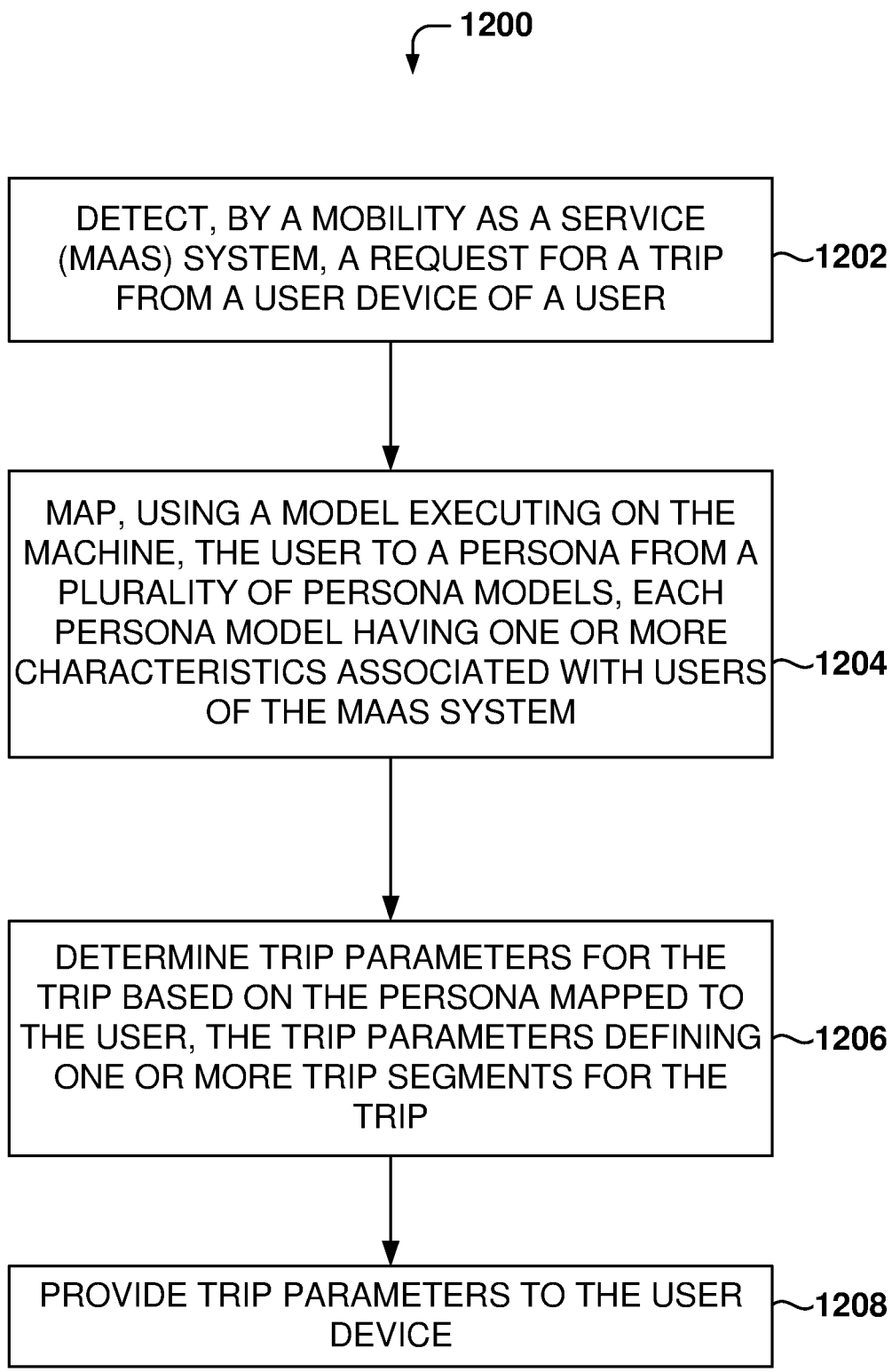
FIG. 12 is a flowchart of a method for implementing PMaaS to improve transportation services delivery, according to some example embodiments.

FIG. 12 is a flowchart of a method 1200 for implementing PMaaS to improve transportation services delivery, according to some example embodiments. While the various operations in this flowchart are presented and described sequentially, one of ordinary skill will appreciate that some or all of the operations may be executed in a different order, be combined or omitted, or be executed in parallel.

At operation 1202, one or more processors of a MaaS system detect a request for a trip from a user device of a user.

From operation 1202, the method 1200 flows to operation 1204 for mapping, using a model executing on the machine, the user to a persona from a plurality of persona models, each persona model having one or more characteristics associated with users of the MaaS system.

From operation 1204, the method 1200 flows to operation 1206 for determining trip parameters for the trip based on the persona mapped to the user, the trip parameters defining one or more trip segments for the trip.

From operation 1206, the method 1200 flows to operation 1208 to provide trip parameters to the user device.

The method 1200 may include additional implementations, such as any single implementation or any combination of implementations described below and/or in connection with one or more other processes described elsewhere herein.

In one example, the model is generated using machine-learning with a training set that includes information of the users of the MaaS system and trips taken by the users.

In one example, the training set is embedded into a user feature matrix, the user feature matrix including, in each row, information about one of the users, the information for each user including information of trips of the user and contextual information of the user.

In one example, the model is trained with information captured by devices of the users of the MaaS system and information received from vehicles of the MaaS system.

In one example, the features of the model comprise user information, trip information, vehicle information, and map information.

In one example, the method 1200 further includes providing an application programming interface (API) at a backend of the MaaS system, the API providing access to information on fleet monitoring and persona information.

In one example, the method 1200 further includes generating a demand model for predicting demand, the demand model based on a graph neural network (GNN) using information about a map in a geographical area, user information, and trips taken by the users of the MaaS system.

In one example, the GNN is generated using a federated model of a plurality of transportation network companies (TNCs), wherein each of the TNCs generates a local demand model and an aggregator combines the local demand models into a general demand model.

In one example, the method 1200 further includes predicting, by a TNC of the plurality of TNCs, demand for the TNC using the local demand model.

In one example, the GNN is based on a graph associated with a corresponding section of a map, each graph comprising nodes corresponding to intersections and connectors corresponding to road segments.

In some implementations, a system comprises: a memory comprising instructions and one or more computer processors of a mobility as a service (MaaS) system, wherein the instructions, when executed by the one or more computer processors, cause the system to perform operations comprising: detecting, by a mobility as a service (MaaS) system, a request for a trip from a user device of a user; mapping, using a model, the user to a persona from a plurality of persona models, each persona model having one or more characteristics associated with users of the MaaS system; determining trip parameters for the trip based on the persona mapped to the user, the trip parameters defining one or more trip segments for the trip; and providing trip parameters to the user device.

In some implementations, a tangible machine-readable storage medium including instructions that, when executed by a machine, cause the machine to perform operations comprising: detecting, by a mobility as a service (MaaS) system, a request for a trip from a user device of a user; mapping, using a model, the user to a persona from a plurality of persona models, each persona model having one or more characteristics associated with users of the MaaS system; determining trip parameters for the trip based on the persona mapped to the user, the trip parameters defining one or more trip segments for the trip; and providing trip parameters to the user device.

In some implementations, a mobility as a service (MaaS) system comprises: means for detecting, by a mobility as a service (MaaS) system, a request for a trip from a user device of a user; means for mapping, using a model, the user to a persona from a plurality of persona models, each persona model having one or more characteristics associated with users of the MaaS system; means for determining trip parameters for the trip based on the persona mapped to the user, the trip parameters defining one or more trip segments for the trip; and means for providing trip parameters to the user device.

Figure 13:
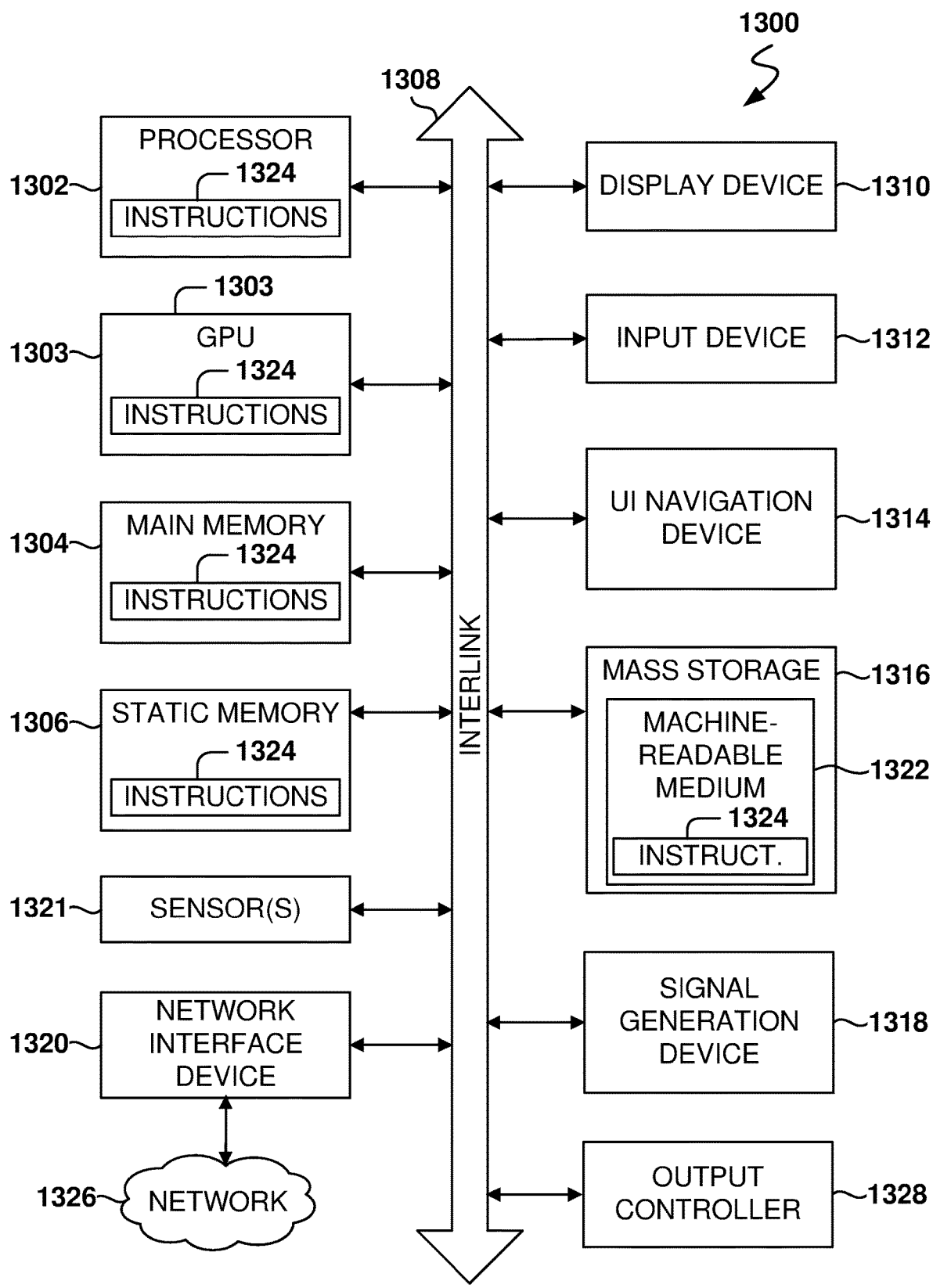
FIG. 13 is a block diagram illustrating an example of a machine upon or by which one or more example process embodiments described herein may be implemented or controlled.

FIG. 13 is a block diagram illustrating an example of a machine 1300 upon or by which one or more example process embodiments described herein may be implemented or controlled. In alternative embodiments, the machine 1300 may operate as a standalone device or may be connected (e.g., networked) to other machines. In a networked deployment, the machine 1300 may operate in the capacity of a server machine, a client machine, or both in server-client network environments. In an example, the machine 1300 may act as a peer machine in a peer-to-peer (P2P) (or other distributed) network environment. Further, while only a single machine 1300 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1300 may include a hardware processor 1302 (e.g., a central processing unit (CPU), a hardware processor core, or any combination thereof), a graphics processing unit (GPU) 1303, a main memory 1304, and a static memory 1306, some or all of which may communicate with each other via an interlink (e.g., bus) 1308. The machine 1300 may further include a display device 1310, an alphanumeric input device 1312 (e.g., a keyboard), and a user interface (UI) navigation device 1314 (e.g., a mouse). In an example, the display device 1310, alphanumeric input device 1312, and UI navigation device 1314 may be a touch screen display. The machine 1300 may additionally include a mass storage device (e.g., drive unit) 1316, a signal generation device 1318 (e.g., a speaker), a network interface device 1320, and one or more sensors 1321, such as a Global Positioning System (GPS) sensor, compass, accelerometer, or another sensor. The machine 1300 may include an output controller 1328, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 1316 may include a machine-readable medium 1322 on which is stored one or more sets of data structures or instructions 1324 (e.g., software) embodying or utilized by any one or more of the techniques or functions described herein. The instructions 1324 may also reside, completely or at least partially, within the main memory 1304, within the static memory 1306, within the hardware processor 1302, or within the GPU 1303 during execution thereof by the machine 1300. In an example, one or any combination of the hardware processor 1302, the GPU 1303, the main memory 1304, the static memory 1306, or the mass storage device 1316 may constitute machine-readable media.

While the machine-readable medium 1322 is illustrated as a single medium, the term "machine-readable medium" may include a single medium, or multiple media, (e.g., a centralized or distributed database, and/or associated caches and servers) configured to store the one or more instructions 1324.

The term "machine-readable medium" may include any medium that is capable of storing, encoding, or carrying instructions 1324 for execution by the machine 1300 and that cause the machine 1300 to perform any one or more of the techniques of the present disclosure, or that is capable of storing, encoding, or carrying data structures used by or associated with such instructions 1324. Non-limiting machine-readable medium examples may include solid-state memories, and optical and magnetic media. In an example, a massed machine-readable medium comprises a machine-readable medium 1322 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1324 may further be transmitted or received over a communications network 1326 using a transmission medium via the network interface device 1320.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A non-transitory tangible machine-readable storage medium including instructions that, when executed by a machine, cause the machine to perform operations comprising:
    detecting, by a mobility as a service (MaaS) system, a request for a trip from a user device of a user;
    mapping, using a model executing on the machine in the MaaS system, the user to a persona from a plurality of persona models, each persona model having one or more characteristics associated with users of the MaaS system;
    generating, by the machine, a graph neural network (GNN) produced from federated learning of a plurality of transportation network companies (TNCs), each of the TNCs generating a local model that are combined into a general model for the federated learning;
    predicting, by the machine, demand for a TNC of the plurality of TNCs using the local model;
    determining, by the machine, trip parameters for the trip based on the persona mapped to the user, the trip parameters defining one or more trip segments for the trip; and
    providing trip parameters from the machine to the user device.

2. The non-transitory tangible machine-readable storage medium as recited in claim 1, wherein the model is generated using machine-learning with a training set that includes information of the users of the MaaS system and trips taken by the users.

3. The non-transitory tangible machine-readable storage medium as recited in claim 2, wherein the training set is embedded into a user feature matrix, the user feature matrix including, in each row, information about one of the users, the information for each user including information of trips of the user and contextual information of the user.

4. The non-transitory tangible machine-readable storage medium as recited in claim 1, wherein the model is trained with information captured by devices of the users of the MaaS system and information received from vehicles of the MaaS system.

5. The non-transitory tangible machine-readable storage medium as recited in claim 1, wherein features of the model comprise user information, trip information, vehicle information, and map information.

6. The non-transitory tangible machine-readable storage medium as recited in claim 1, further comprising:
    providing an application programming interface (API) at a backend of the MaaS system, the API providing access to information on fleet monitoring and persona information.

7. The non-transitory tangible machine-readable storage medium as recited in claim 1, further comprising:
    generating a demand model for predicting demand based on the GNN using information about a map in a geographical area, user information, and trips taken by the users of the MaaS system, the local model and the general model including demand models.

8. The non-transitory tangible machine-readable storage medium as recited in claim 1, wherein the GNN is based on a graph associated with a corresponding section of a map, each graph comprising nodes corresponding to intersections and connectors corresponding to road segments.

9. The non-transitory tangible machine-readable storage medium as recited in claim 1, wherein each persona model is a fictional person.

10. A system comprising:
    a memory comprising instructions; and
    one or more computer processors of a mobility as a service (MaaS) system, wherein the instructions, when executed by the one or more computer processors, cause the system to perform operations comprising:
        detecting, by the one or more computer processors in the MaaS system, a request for a trip from a user device of a user;
        mapping, by the one or more computer processors using a model, the user to a persona from a plurality of persona models, each persona model having one or more characteristics associated with users of the MaaS system;
        generating, by the one or more computer processors, a graph neural network (GNN) produced from federated learning of a plurality of transportation network companies (TNCs), each of the TNCs generating a local model that are combined into a general model for the federated learning;
        predicting, by the one or more computer processors, demand for a TNC of the plurality of TNCs using the local model;
        determining, by the one or more computer processors, trip parameters for the trip based on the persona mapped to the user, the trip parameters defining one or more trip segments for the trip; and
        providing trip parameters to the user device.

11. The system as recited in claim 10, wherein the model is generated using machine-learning with a training set that includes information of the users of the MaaS system and trips taken by the users.

12. The system as recited in claim 11, wherein the training set is embedded into a user feature matrix, the user feature matrix including, in each row, information about one of the users, the information for each user including information of trips of the user and contextual information of the user.

13. The system as recited in claim 10, wherein the model is trained with information captured by devices of the users of the MaaS system and information received from vehicles of the MaaS system.

14. The system as recited in claim 10, wherein features of the model comprise user information, trip information, vehicle information, and map information.

15. The system as recited in claim 10, wherein the instructions further cause the one or more computer processors to perform operations comprising:
provinding an application programming interface (API) at a backend of the MaaS system, the API providing access to information on fleet monitoring and persona information.

16. The system as recited in claim 10, wherein the instructions further cause the one or more computer processors to perform operations comprising:
generating a demand model for predicting demand based on the GNN using information about a map in a geographical area, user information, and trips taken by the users of the MaaS system, the local model and the general model including demand models.

17. A method comprising:
detecting, by a processor in a mobility as a service (MaaS) system, a request for a trip from a user device of a user;
mapping, by the processor using a model, the user to a persona from a plurality of persona models, each persona model having one or more characteristics associated with users of the MaaS system;
generating, by the processor, a graph neural network (GNN) produced from federated learning of a plurality of transportation network companies (TNCs), each of the TNCs generating a local model that are combined into a general model for the federated learning;
predicting, by the processor, demand for a TNC of the plurality of TNCs using the local model;
determining, by the processor, trip parameters for the trip based on the persona mapped to the user, the trip parameters defining one or more trip segments for the trip; and
providing trip parameters to the user device.

18. The non-transitory tangible machine-readable storage medium as recited in claim 1, wherein:
features of the model comprise user information, and the user information contains:
contextual data of the user that includes user profile information and activities that the user may be engaged in during the trip, and
behavioral data that includes raw user event data captured during previous sessions in which the user uses mobility services and applications,
the contextual data and behavioral data are respectfully associated with contextual features and behavior features, and
the contextual features and behavior features form a vector in a user feature matrix of multiple users.

19. The non-transitory tangible machine-readable storage medium as recited in claim 18, wherein the instructions, when executed by the machine, cause the machine to perform operations comprising:
using, by a feature transformation and extraction component, a list of previous user trip sequences to create trip segments that are adjacent segments of the trip sequences,
creating a user-segment graph used to derive the user feature matrix, and
for a new user that has not taken any trips and has no segments, leverage contextual features of the new user to make recommendations by finding users with similar contextual data in different vectors.

20. The non-transitory tangible machine-readable storage medium as recited in claim 1, wherein the instructions, when executed by the machine, cause the machine to perform operations comprising:
segmenting a multimodal trip into multiple segments,
generating a segment-to-segment graph,
predicting a probability of the multimodal trip for a given persona, the probability being a product over all the segments of the multimodal trip, the GNN being used to learn the probability of transitioning from any trip segment to any other trip segment for the given persona, and
selecting the multimodal trip that gives a highest probability of the user making the selection and recommend the multimodal trip.

21. The non-transitory tangible machine-readable storage medium as recited in claim 1, wherein:
the GNN is independent of location data,
a persona-based modelling database and a graph database created based on persona-based modelling provide location-independent user behavior modelling, and
the instructions, when executed by the machine, cause the machine to perform operation s comprising using the graph database for service and demand prediction and individual ride planning for scaling of MaaS services in new geographic areas.

22. The non-transitory tangible machine-readable storage medium as recited in claim 1, wherein:
the GNN is converted from a map using different road subnetworks of the map in which each edge represents a physical segment of a road and nodes are intersections of road segments,
a GNN model is trained using candidate road subnetworks to process data for smaller road networks instead of an entire map, and
graph signals are defined to each of the road subnetworks based on information collected from different locations and vehicles relating to the locations, the graph signals defined such that each node is characterized by a multi-dimensional feature vector that corresponds to attributes relating to dynamic information.

* * * * *